(12) United States Patent
Lopez et al.

(10) Patent No.: US 11,619,493 B2
(45) Date of Patent: Apr. 4, 2023

(54) OPTICAL GYROSCOPE WITH WEAK MEASUREMENT AMPLIFICATION READOUT

(71) Applicant: DRS Network & Imaging Systems, LLC, Melbourne, FL (US)

(72) Inventors: Marco A. Lopez, Villa Park, CA (US); Andrew Jordan, Rochester, NY (US); Kevin Lyons, Clifton Park, NY (US); John Steinmetz, Rochester, NY (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 0 days.

(21) Appl. No.: 17/511,132

(22) Filed: Oct. 26, 2021

(65) Prior Publication Data
US 2022/0128361 A1   Apr. 28, 2022

Related U.S. Application Data

(60) Provisional application No. 63/106,240, filed on Oct. 27, 2020.

(51) Int. Cl.
*G01C 19/66*   (2006.01)
*G02B 6/293*   (2006.01)

(52) U.S. Cl.
CPC ....... *G01C 19/662* (2013.01); *G02B 6/29338* (2013.01)

(58) Field of Classification Search
CPC .. G01C 19/661; G01C 19/662; G01C 19/721; G01C 19/722
See application file for complete search history.

(56) References Cited

U.S. PATENT DOCUMENTS 5,835,199 A   11/1998   Phillips et al.
7,106,448 B1   9/2006   Vawter et al.
(Continued)

FOREIGN PATENT DOCUMENTS

CN   106052840 A   10/2016
CN   207317950 U   5/2018
(Continued)

OTHER PUBLICATIONS

Qi, Yuefeng et al. "Application of a novel spatial non-reciprocal phase modulator in fiberoptic gyroscope". Optical Fiber Technology 58, 102258, Jun. 20, 2020, pp. 1-8. (Year: 2020).*
(Continued)

*Primary Examiner* — Michael A Lyons
(74) *Attorney, Agent, or Firm* — Kilpatrick Townsend & Stockton LLP

(57) ABSTRACT

A photonic device for detecting rotation and a corresponding method for operation thereof are disclosed. The photonic device includes a readout structure coupled to a ring resonator at one or more coupling points. Light is split between a lower waveguide and an upper waveguide of the readout structure in a forward direction at a beam splitter. The light in the waveguides traveling in the forward direction is coupled into the ring resonator and subsequently back into the waveguides in a reverse direction. The light is spatially phase tilted and is combined at the beam splitter. The combined light is detected by a split detector.

20 Claims, 14 Drawing Sheets

(56) References Cited

U.S. PATENT DOCUMENTS

| | | |
|---|---|---|
| 11,353,562 B2 | 6/2022 | Lopez et al. |
| 2005/0185191 A1 | 8/2005 | Shpantzer et al. |
| 2009/0068668 A1 | 3/2009 | Duer |
| 2009/0323074 A1 | 12/2009 | Klebanov |
| 2011/0164299 A1* | 7/2011 | Morton ............ G02F 1/0147 359/238 |
| 2015/0316580 A1* | 11/2015 | Hutchison ........... G01P 15/093 385/13 |
| 2017/0059301 A1 | 3/2017 | Rhoadarmer et al. |
| 2017/0059392 A1 | 3/2017 | Lam et al. |
| 2017/0241784 A1 | 8/2017 | Salit et al. |
| 2020/0124707 A1 | 4/2020 | Lopez et al. |
| 2021/0165102 A1 | 6/2021 | Crouch et al. |

FOREIGN PATENT DOCUMENTS

| | | | |
|---|---|---|---|
| JP | 2567486 B2 * | 12/1996 | ........... G01C 19/726 |
| WO | 2020086587 A1 | 4/2020 | |

OTHER PUBLICATIONS

Arbab et al., "Measurements of the Refractive Indices and Thermo-Optic Coefficients of Si3N4 and SiOx Using Microring Resonances", Optics Letters, vol. 38, No. 19, Oct. 1, 2013, pp. 3878-3881.

Bortolozzo et al., "Precision Doppler Measurements with Steep Dispersion", Optics Letters, vol. 38, No. 16, Aug. 15, 2013, pp. 3107-3110.

Dixon et al., "Ultrasensitive Beam Deflection Measurement Via Interferometric Weak Value Amplification", Physical Review Letters, vol. 102, 2009, 5 pages.

Dressel , "Weak values as Interference Phenomena", Physical Review A, vol. 91, 2015, pp. 032116-1-032116-14.

Hosten et al., "Observation of the Spin Hall Effect of Light Via Weak Measurements", Science, vol. 319, Feb. 8, 2008, pp. 787-790.

Hu et al., "Gravitational Waves Detection Via Weak Measurements Amplification", arXiv:1707.00886v2, Available Online at: https://arxiv.org/pdf/1707.00886.pdf, Nov. 2, 2017, pp. 1-5.

Nauriyal et al., "Fiber to Chip Fusion Splicing for Robust, Low Loss Photonic Packaging", Applied Physics, Oct. 2018, pp. 1-12.

Nishizawa , "Weak Value Amplification and Beyond the Standard Quantum Limit in Position Measurements", Physical Review A, vol. 92, Apr. 29, 2015, 13 pages.

Application No. PCT/US2019/057446 , International Search Report and Written Opinion, dated Jan. 14, 2020, 12 pages.

Application No. PCT/US2021/056643 , International Search Report and Written Opinion, dated Jan. 26, 2022, 8 pages.

Starling et al., "Continuous Phase Amplification with a Sagnac Interferometer", Physical Review A, vol. 82, Dec. 16, 2009, 5 pages.

Starling et al., "Optimizing the Signal-to-Noise Ratio of a Beam-Deflection Measurement With Interferometric Weak Values", Physical Review A, vol. 80, No. 4, 2009, pp. 041803-1-041803-4.

Starling et al., "Precision Frequency Measurements with Interferometric Weak Values", Physical Review A, vol. 82, Dec. 2010, 4 pages.

Tamir et al., "Introduction to Weak Measurements and Weak Values", Quanta, vol. 2, Issue 1, 2013, pp. 7-17.

Viza et al., "Experimentally Quantifying the Advantages of Weak-Values-Based Metrology", Physical Review A, vol. 92, 2015, 11 pages.

Viza et al., "Weak Values Technique for Precision Measurements of Doppler Shifts", Optics Letters, vol. 38, Issue 16, 2013, 4 pages.

U.S. Appl. No. 16/660,437 , Non-Final Office Action, dated Oct. 21, 2021, 5 pages.

U.S. Appl. No. 16/660,437 , Notice of Allowance, dated Feb. 7, 2022, 12 pages.

Application No. EP19876030.8 , Extended European Search Report, dated Jun. 15, 2022, 6 pages.

* cited by examiner

| Parameter | Measured Results for Ring Radius = 50 μm |
|---|---|
| Sensitivity (deg/sec) | 3.16e-2 @ SNR = 15 |
| Temp Stability (deg C) | +/- 11 |
| Repeatability (%) | 98.4 |
| ARW (deg/√hour) | 1586 |
| Bias Stability (deg/sec) | 0.1 |
| Precision (deg/sec/√Hz) | 0.56 |

FIG. 9

| Gyro Type | Ring Radius (mm) | ARW (deg/root hour) | Precision (deg/sec/root Hz) | Bias Stability (deg/hr) |
|---|---|---|---|---|
| WMA Gyro | 30 | 0.001 | 0.03 | 0.005 |
| Brillion RLG | 36 | 0.068 | Not listed | 3.6 |
| m-HRG | N/A | 0.133 | Not listed | 0.133 |

FIG. 10

| Applications | Input power (mW) | Radius (mm) | Q-Factor | Angle Random Walk (deg/sqr hour) | Precision (deg/s/sqr Hz) | Bias Stability (deg/hr) | Dynamic Range (deg/sec) |
|---|---|---|---|---|---|---|---|
| Dismount FWS-I | 0.5 | 0.1 | $10^5$ | 412 | 6.8 | 136.8 or (0.038 deg/sec) | $4\times10^6$ |
| Dismounts (NF/NK) | 5 | 1 | $10^6$ | 1.2 | 0.02 | 1.35 | $4\times10^4$ |
| Ground Vehicle EO/IR | 20 | 5 | $10^6$ | 0.13 | 7.8 | 0.27 | 8600 |
| Drone Navigating | 20 | 5 | $10^7$ | 0.013 | 0.78 | 0.027 | 860 |
| Airborne Navigating | 50 | 10 | $10^7$ | 0.004 | 0.24 | 0.016 | 430 |
| Strategic Navigation | 50 | 30 | $10^8$ | 0.001 | 0.03 | 0.005 | 143 |

FIG. 12

OPTICAL GYROSCOPE WITH WEAK MEASUREMENT AMPLIFICATION READOUT

CROSS-REFERENCES TO RELATED APPLICATIONS

This application claims priority to U.S. Provisional Application No. 63/106,240 filed on Oct. 27, 2020 entitled "Optical Gyroscope With Weak Measurement Amplification Readout," the contents of which are incorporated by reference herein for all purposes.

BACKGROUND OF THE INVENTION

Recent efforts have considered different ways to miniaturize inertial measurement units (IMUs), which would be a huge boon for many areas of navigation. Such miniaturized IMUs could be incorporated into an electronic chip, and would consume less power. Accurate and small scale IMUs could become a widespread and common technology. For example, IMUs could be used as a compliment to Global Positioning System (GPS) navigation, particularly in situations when GPS signals cannot be accessed for a variety of reasons.

One approach for pursuing such IMUs includes utilizing elastic waves in a three-dimensional (3D) structure that freely precess in absolute space, independent of device rotation. Other approaches include Nuclear Magnetic Resonance (NMR) and Atomic Interferometry (AI) inertial sensors. Despite the progress made, new systems, methods, and other techniques are needed.

SUMMARY OF THE INVENTION

Embodiments described herein relate broadly to optical gyroscopes based on the field of integrated optics. The operating principle is the fabrication of optical waveguides at the scale of an optical chip. The controlled motion of light through microscale waveguides and interferometers can serve as a stable platform for sensitive gyroscope and inertial measurement unit (IMU) measurements. Embodiments described herein are suitable for a variety applications, particularly when the described gyroscope is combined with a comparable precision accelerometer, which would enable miniaturized inertial navigation.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of detecting a rotation of a photonic device, the method comprising: inputting light into a readout structure; splitting, at a beam splitter, the light between a lower waveguide and an upper waveguide of the readout structure in a forward direction; coupling the light in the lower waveguide traveling in the forward direction and the light in the upper waveguide traveling in the forward direction into a ring resonator at one or more coupling points; coupling the light in the ring resonator into the lower waveguide and the upper waveguide in a reverse direction at the one or more coupling points; spatially phase tilting, by one or more spatial phase tilters, one or both of the light in the lower waveguide and the light in the upper waveguide; combining, at the beam splitter, the light in the lower waveguide traveling in the reverse direction and the light in the upper waveguide traveling in the reverse direction to form output light; and detecting the output light, wherein the rotation is calculated based on the output light.

Example 2 is the method of example(s) 1, wherein the one or more coupling points is a single coupling point, and wherein the lower waveguide and the upper waveguide are connected to each other at the single coupling point.

Example 3 is the method of example(s) 1, wherein the one or more coupling points include two coupling points, and wherein the lower waveguide and the upper waveguide are unconnected to each other at either of the two coupling points.

Example 4 is the method of example(s) 1-3, wherein the beam splitter is formed by positioning a region of the lower waveguide within a threshold distance of a region of the upper waveguide.

Example 5 is the method of example(s) 1-4, wherein the photonic device includes a light source for generating the light.

Example 6 is the method of example(s) 1-5, wherein the ring resonator introduces a relative phase shift between the light in the lower waveguide traveling in the reverse direction and the light in the upper waveguide traveling in the reverse direction.

Example 7 is the method of example(s) 1-6, further comprising calculating the rotation based on an analysis of the output light.

Example 8 is the method of example(s) 7, wherein calculating the rotation based on the analysis of the output light includes: determining an intensity difference between a first lobe and a second lobe of the output light; and calculating the rotation based on the intensity difference.

Example 9 is the method of example(s) 1-8, wherein the photonic device comprises a gyroscope.

Example 10 is a photonic device comprising: a ring resonator; and a readout structure coupled to the ring resonator at one or more coupling points, the readout structure comprising: a lower waveguide and an upper waveguide; an input port coupled to the lower waveguide or the upper waveguide, the input port configured to receive light; a beam splitter for splitting the light between the lower waveguide and the upper waveguide in a forward direction and for combining the light in the lower waveguide traveling in a reverse direction and the light in the upper waveguide traveling in the reverse direction to form output light; one or more spatial phase tilters for spatially phase tilting one or both of the light in the lower waveguide and the light in the upper waveguide; and a detector for detecting the output light; wherein the photonic device is configured to: couple the light in the lower waveguide traveling in the forward direction and the light in the upper waveguide traveling in the forward direction into the ring resonator at the one or more coupling points; and couple the light in the ring resonator into the lower waveguide and the upper waveguide in a reverse direction at the one or more coupling points.

Example 11 is the photonic device of example(s) 10, wherein the one or more coupling points is a single coupling point, and wherein the lower waveguide and the upper waveguide are connected to each other at the single coupling point.

Example 12 is the photonic device of example(s) 10, wherein the one or more coupling points includes two coupling points, and wherein the lower waveguide and the upper waveguide are unconnected to each other at either of the two coupling points.

Example 13 is the photonic device of example(s) 10-12, wherein the beam splitter is formed by positioning a region of the lower waveguide within a threshold distance of a region of the upper waveguide.

Example 14 is the photonic device of example(s) 10-13, further comprising a light source configured to generate the light.

Example 15 is the photonic device of example(s) 10-14, wherein the ring resonator introduces a relative phase shift between the light in the lower waveguide traveling in the reverse direction and the light in the upper waveguide traveling in the reverse direction.

Example 16 is the photonic device of example(s) 10-15, wherein a rotation of the photonic device is calculated based on an analysis of the output light.

Example 17 is the photonic device of example(s) 16, wherein the rotation is calculated based on an intensity difference between a first lobe and a second lobe of the output light.

Example 18 is the photonic device of example(s) 10-17, wherein the photonic device comprises a gyroscope.

Example 19 is a photonic device comprising: a ring resonator; and a readout structure coupled to the ring resonator at one or more coupling points, the readout structure comprising: an input port for receiving light; a lower waveguide and an upper waveguide for carrying the light in both a forward direction and a reverse direction; a beam splitter formed between the lower waveguide and the upper waveguide for splitting the light; one or more spatial phase tilters formed on the lower waveguide or the upper waveguide for spatially phase tilting the light; and a detector for detecting the light traveling in the reverse direction.

Example 20 is the photonic device of example(s) 19, wherein a rotation of the photonic device is calculated based on an analysis of the detected light.

Numerous benefits are achieved by way of the present invention. For example, some embodiments of the present invention utilize a weak value readout method to enhance the signal-to-noise (SNR) ratio over existing integrated optical gyroscopes. Some embodiments can achieve one or two orders of magnitude improvement in rotation precision and reduction of sources of error noise. For example, some embodiments can achieve a precision of 0.01°/h, and a bias stability of 0.005°/h. Such performance numbers would enable platform stabilization (for tactical applications), missile navigation (for high-end tactical applications), as well as aeronautics navigation. Other benefits of the present invention will be readily apparent to those skilled in the art.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label, irrespective of the second reference label.

FIG. 9 illustrates a table showing experimental results for a gyroscope.

FIG. 10 illustrates a table showing a comparison between experimental results achieved for a gyroscope of the present invention and conventional approaches.

FIG. 12 illustrates a table showing design parameters of a gyroscope of the present invention and predicted performance for various applications.

DETAILED DESCRIPTION OF SPECIFIC EMBODIMENTS

Figure 1:
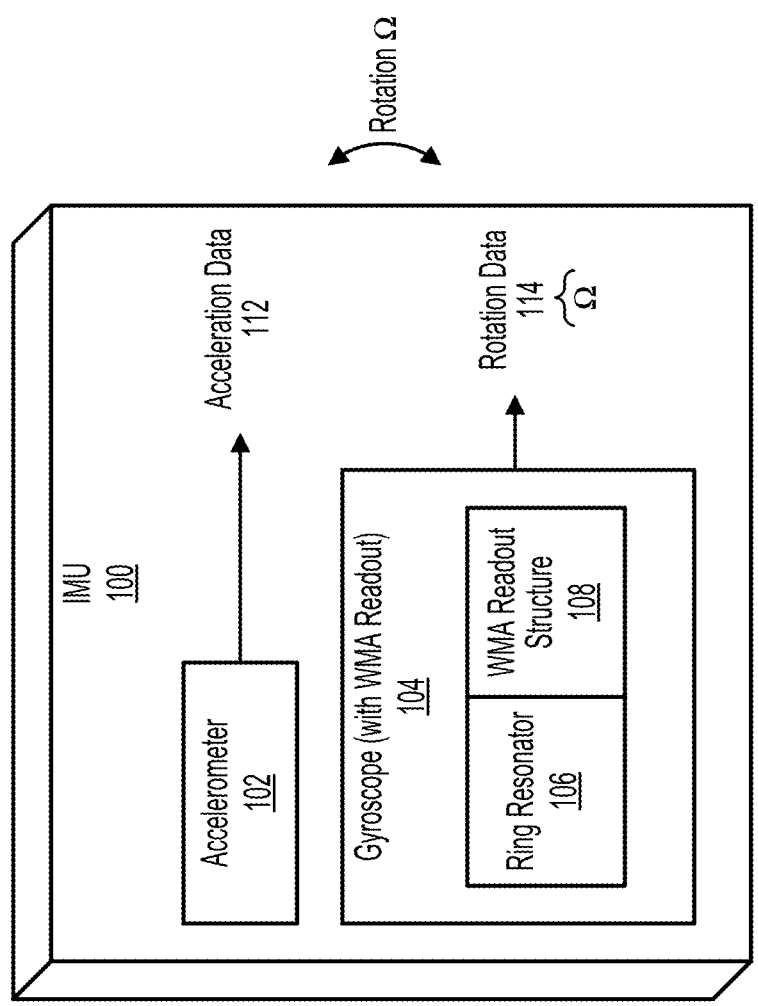
FIG. 1 illustrates an example of an IMU that includes various motion-detecting components, including an accelerometer and a gyroscope.

The incorporation of weak value techniques, such as weak value amplification (WVA) and inverse weak value amplification (IWVA), into the field of integrated photonics creates a number of useful applications. Many of these applications are due to the reduction of the size of the measuring system to the millimeter scale. Further more, since integrated photonic devices are inherently stable, they are less susceptible to environmental factors, such as vibrations. With an on-chip weak value amplification device, precision measurements can be carried out in a small volume with reliable performance. The weak value technique allows the amplification of small signals by introducing a weak perturbation to the system and performing a post-selection on the data.

In some instances, IWVA can be demonstrated using free space optics and a misaligned Sagnac interferometer. One goal may be to measure the relative phase shift $\phi$ between the two paths of the interferometer. The misalignment introduces a phase front tilt k to one path of the interferometer and -k to the other.

$$\psi_\pm(x) = \phi_0(x) e^{\pm i\left(kx - \frac{\phi}{2}\right)}$$

When the two paths interfere at the beam splitter, considering a Gaussian input, the dark port becomes, $$\psi_D(x) \propto \psi_+(x) - \psi_-(x) = \frac{e^{\frac{x^2}{4\sigma^2}}}{(2\pi\sigma^2)^{\frac{1}{4}}} \sin\left(kx - \frac{\phi}{2}\right)$$

By measuring the mean location shift $-\phi/(2k)$ of the dark port pattern, the phase shift $\phi$ is determined.

To bring free space IWVA to the integrated photonics regime, the above expressions are expanded into Hermite- Gaussian (HG) modes. The beams are composed mainly of the $HG_1$ mode, with a small contribution of the $HG_0$ mode. Contribution of the higher modes is negligible. Therefore, the phase front tilt can be considered as coupling the initial $HG_0$ mode partially into the $HG_1$ mode.

$$\psi_{\pm}(x) \approx \left(1 \mp i\frac{\phi}{2}\right) HG_0 \pm ik\sigma HG_1$$

$$\psi_D(x) \propto i\frac{\phi}{2} HG_0 + ik\sigma HG_1$$

Eigenmodes of a waveguide are similar to Hermite-Gaussian modes. The theory described above can be applied to waveguide eigenmodes $TE_0$ and $TE_1$, assuming that a $TE_0$ mode is sent into an upper waveguide of the device. Its power is split in half and the fields become, $$E_1 = \frac{1}{\sqrt{2}} TE_0(x)$$

$$E_2 = \frac{1}{\sqrt{2}} TE_0(x)$$

Then a relative phase $\phi$ between the two paths is added, $$E_1 = \frac{e^{i\frac{\phi}{2}}}{\sqrt{2}} TE_0(x)$$

$$E_2 = \frac{e^{-i\frac{\phi}{2}}}{\sqrt{2}} TE_0(x)$$

Similar to the free space case, part of the $TE_0$ mode is coupled to the $TE_1$ mode, with opposite phases in the two paths. $\alpha$ is the percentage of the $TE_0$ mode coupled to the $TE_1$ mode, which is small.

$$E_1 = \frac{e^{i\frac{\phi}{2}}}{\sqrt{2}} [(1-a)TE_0(x) + iaTE_1(x)]$$

$$E_2 = \frac{e^{-i\frac{\phi}{2}}}{\sqrt{2}} [(1-a)TE_0(x) - iaTE_1(x)]$$

After the two paths interfere at the second 50/50 splitter, the dark port becomes, $$E_d = E_1 - E_2 = i\left[(1-a)TE_0(x)\sin\frac{\phi}{2} + \alpha TE_1(x)\cos\frac{\phi}{2}\right]$$

Since $\phi$ is very small, $$E_d \approx i\left[(1-a)\frac{\phi}{2}TE_0(x) + aTE_1(x)\right] = ia\left[\frac{(1-a)}{a}\frac{\phi}{2}TE_0(x) + TE_1(x)\right]$$

Therefore, by analyzing the ratio between the $TE_0$ and $TE_1$ modes, the phase $\phi$ can be determined.

Embodiments of the invention are related to methods, systems, and other techniques for implementing a gyroscope with weak measurement amplification (WMA) readout. Specifically, embodiments relate to a chip-scale integrated optics WMA sensor for detecting rotations of the sensor. The sensor is alternatively referred to throughout the present description as a gyroscope, a gyroscope with WMA readout, an optical device, a photonic device, and a chip-scale device, among others. These terms may be used interchangeably, and the use of one term over another should not be considered limiting unless indicated otherwise.

In some embodiments, a chip-scale gyroscope is provided that includes a ring resonator that is weakly coupled (e.g., evanescently coupled) to an interferometric readout structure. The rotation sensing ring may be coupled with a single or multiple points of contact to the readout structure. Light is injected into the chip at one end of a lower waveguide and is split at a 50/50 beam splitter (implemented with waveguide coupling) into lower and upper waveguides. The light then transverses and couples to the ring resonator from both paths. The light changes its magnitude and phase from the ring coupling, and the phase due to rotation is imparted. That phase is then read out with the inverse weak value interferometer implented by the readout structure. Light is tapped out with auxiliary waveguides and the primary waveguides. In the reverse direction, the beam splitter interferes both lower and higher modes, so the final mode sorter takes a small portion of information rich light, and divides it into two outputs, which are detected and differenced.

FIG. 1 illustrates an example of an IMU 100 that includes various motion detecting components, including an accelerometer 102 and a gyroscope 104, according to some embodiments of the present invention. Accelerometer 102 may be configured to generate acceleration data 112, which may include accelerations, linear velocities, and/or linear positions for IMU 100. Gyroscope 104 may be configured to generate rotation data 114, which may include angular accelerations, angular velocities/rates, and/or angular positions. Gyroscope 104 may further be configured to detect a rotation $\Omega$ experienced by IMU 100. Gyroscope 104 may include a ring resonator 106 and a WMA readout structure 108, which may alternatively be referred to as an IWVA readout structure.

Figure 2A:
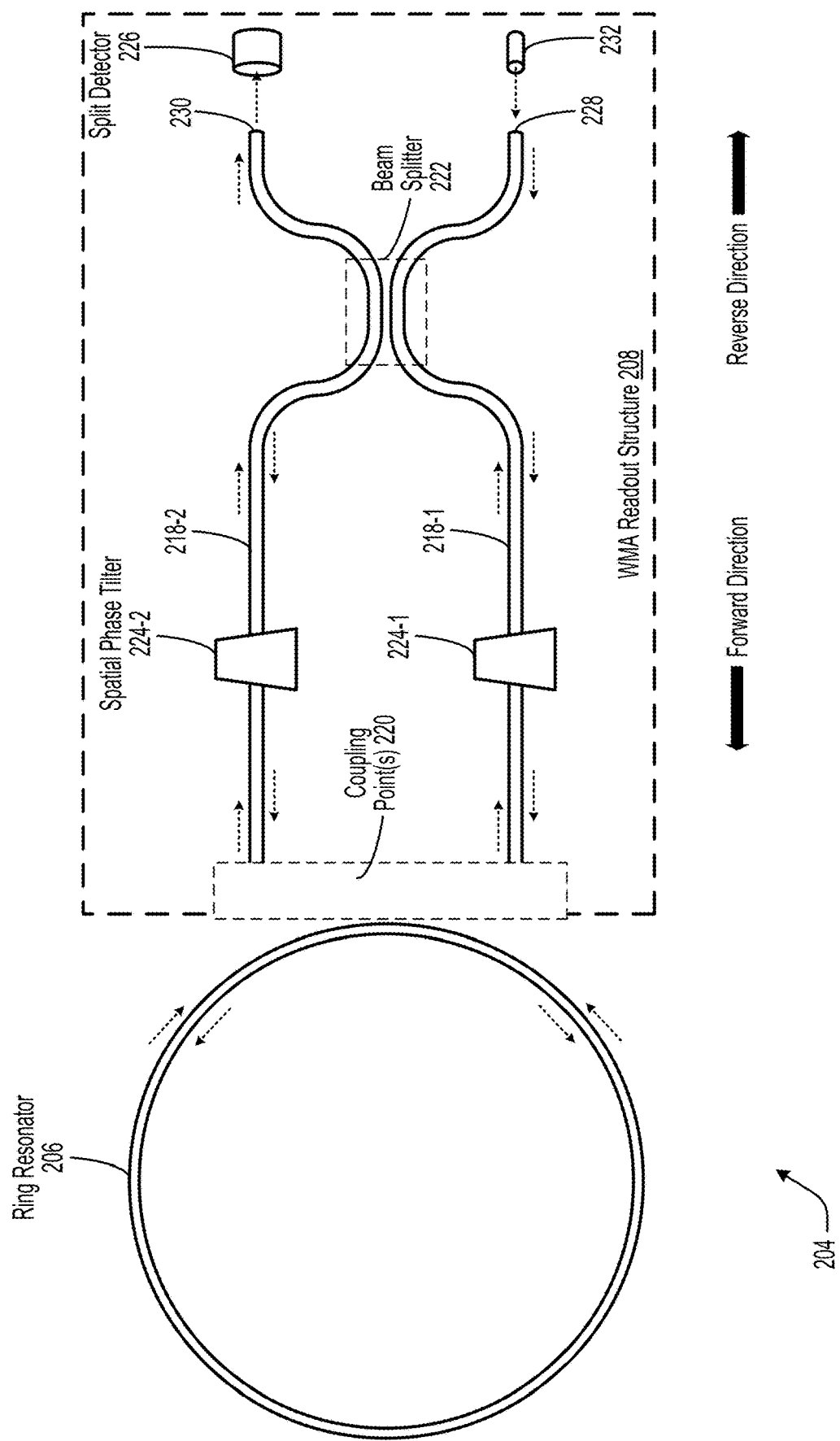
FIGS. 2A and 2B illustrate an example architecture of a gyroscope.
Figure 2B:
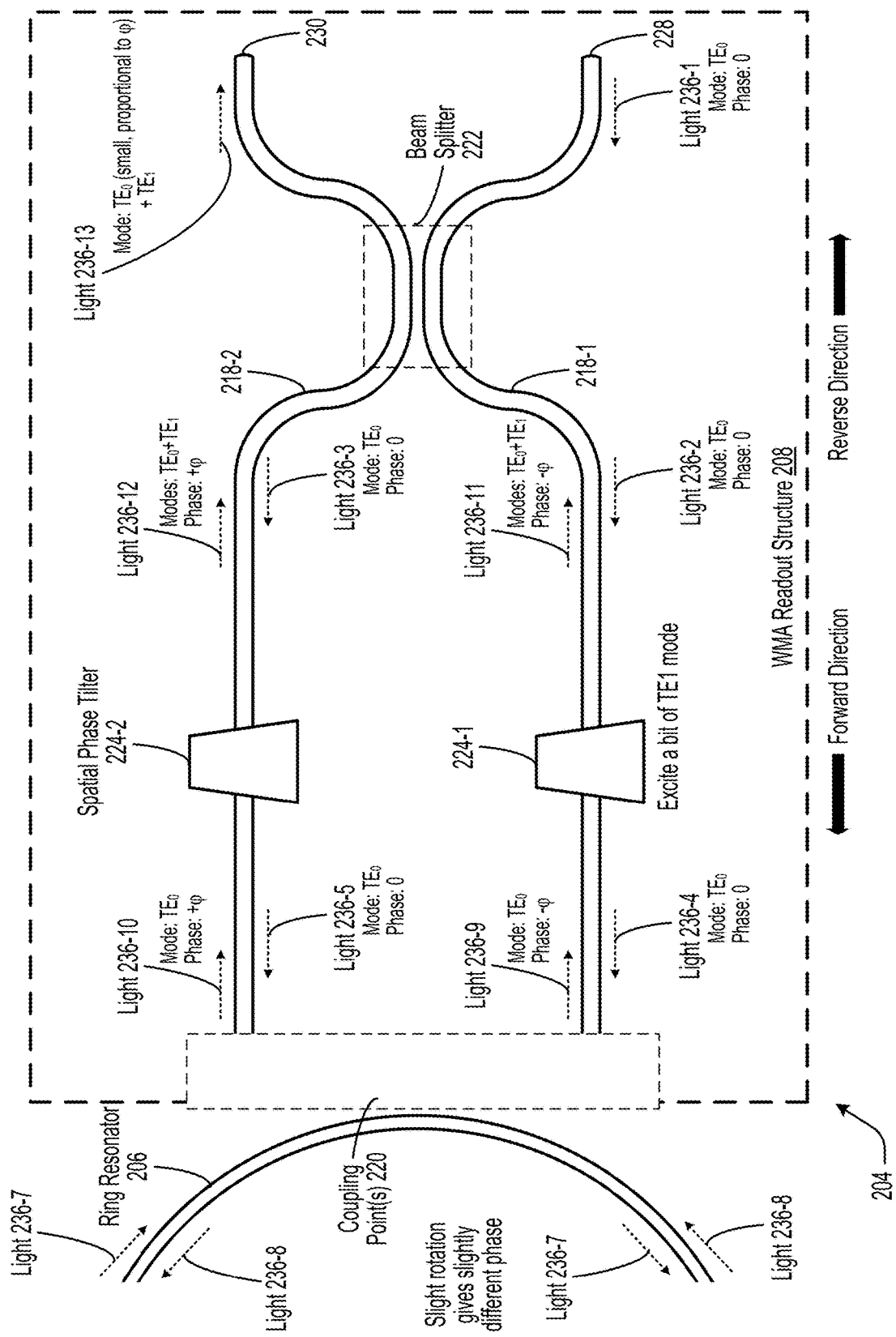

FIGS. 2A and 2B illustrate an example architecture of a gyroscope 204, according to some embodiments of the present invention. Gyroscope 204 may include a lower waveguide 218-1 and an upper waveguide 218-2, which may alternatively be referred to as a first waveguide and a second waveguide, respectively. Lower waveguide 218-1 may include an input port 228 located at one end where light may be input into lower waveguide 218-1, and upper waveguide 218-2 may include an output port 230 located at one end where light may be output from upper waveguide 218-2. In some instances, the light that is input at input port 228 may be referred to as input light, and the light that is output at output port 230 may be referred to as output light. In some embodiments, a light generator 232 may generate the light that is input at input port 228.

WMA readout structure 208 may include a beam splitter 222 that is formed on and/or between lower waveguide 218-1 and upper waveguide 218-2. For example, a portion of lower waveguide 218-1 may be positioned in close proximity (e.g., within an evanescent threshold distance) to a portion of upper waveguide 218-2 to implement beam splitter 222. For light traveling in lower waveguide 218-1 in the forward direction (e.g., input light), beam splitter 222 may be configured to split the light equally between lower waveguide 218-1 and upper waveguide 218-2. For light traveling in both lower waveguide 218-1 and upper waveguide to 218-2 in the reverse direction, beam splitter 222 may be configured to split the light in each waveguide equally between lower waveguide 218-1 and upper waveguide 218-2. As such, at least a portion of the light traveling in both waveguides in the reverse direction may be combined to form the output light that is output from upper waveguide 218-2 at output port 230.

In some embodiments, beam splitter 222 is formed by providing evanescent coupling (or evanescent-wave coupling) between lower waveguide 218-1 and upper waveguide 218-2. In such embodiments, lower waveguide 218-1 may be considered to be evanescently coupled to upper waveguide 218-2. As noted above, this can be accomplished by bringing a portion of lower waveguide 218-1 in close proximity (e.g., within a threshold distance) to a portion of upper waveguide 218-2. In some embodiments, beam splitter 222 may be a multi-mode beam splitter that supports evanescent coupling of both $TE_0$ and $TE_1$ modes (or $TM_0$ and $TM_1$ modes). In one implementation, beam splitter 222 is formed by a gap of 0.5 μm and a length of 250 μm.

WMA readout structure 208 may include one or more spatial phase tilters 224 (also referred to as phase front tilters) that are formed on one or both of lower waveguide 218-1 and upper waveguide 218-2. In the illustrated example, a lower spatial phase tilter 224-1 is formed on lower waveguide 218-1 and an upper spatial phase tilter 224-2 is formed on upper waveguide to 218-2. In some embodiments, each of spatial phase tilters 224 is configured to spatially phase tilt the light passing therethrough, such that the modes $TE_0$ and $TE_1$ (or $TM_0$ and $TM_1$) acquire opposite tilted phase fronts. In some embodiments, an extra spatial phase tilt is created of the form $e^{\pm iKx}$, which is equivalent to introducing the next mode. For example, spatial phase tilters 224 may be configured to excite a $TE_1$ mode (or $TM_1$ mode) in a light signal carrying only a $TE_0$ mode ($TM_0$ mode).

In some embodiments, one or both of spatial phase tilters 224 may include a mode exciter, such as a prism fabricated within one or both of waveguides 218, that is configured to excite a superposition of odd order modes in the light passing therethrough. The mode exciter may include a gradient in the index of refraction across the transverse profile of the waveguide causing some of the electric field amplitude to be transferred to the first excited mode. In some embodiments, one or both of spatial phase tilters 224 may be implemented by widening waveguides 218 at a particular widening point along waveguides 218, such that only a single mode is supported prior to the widening point and a second mode is supported after the widening point.

Figure 7:
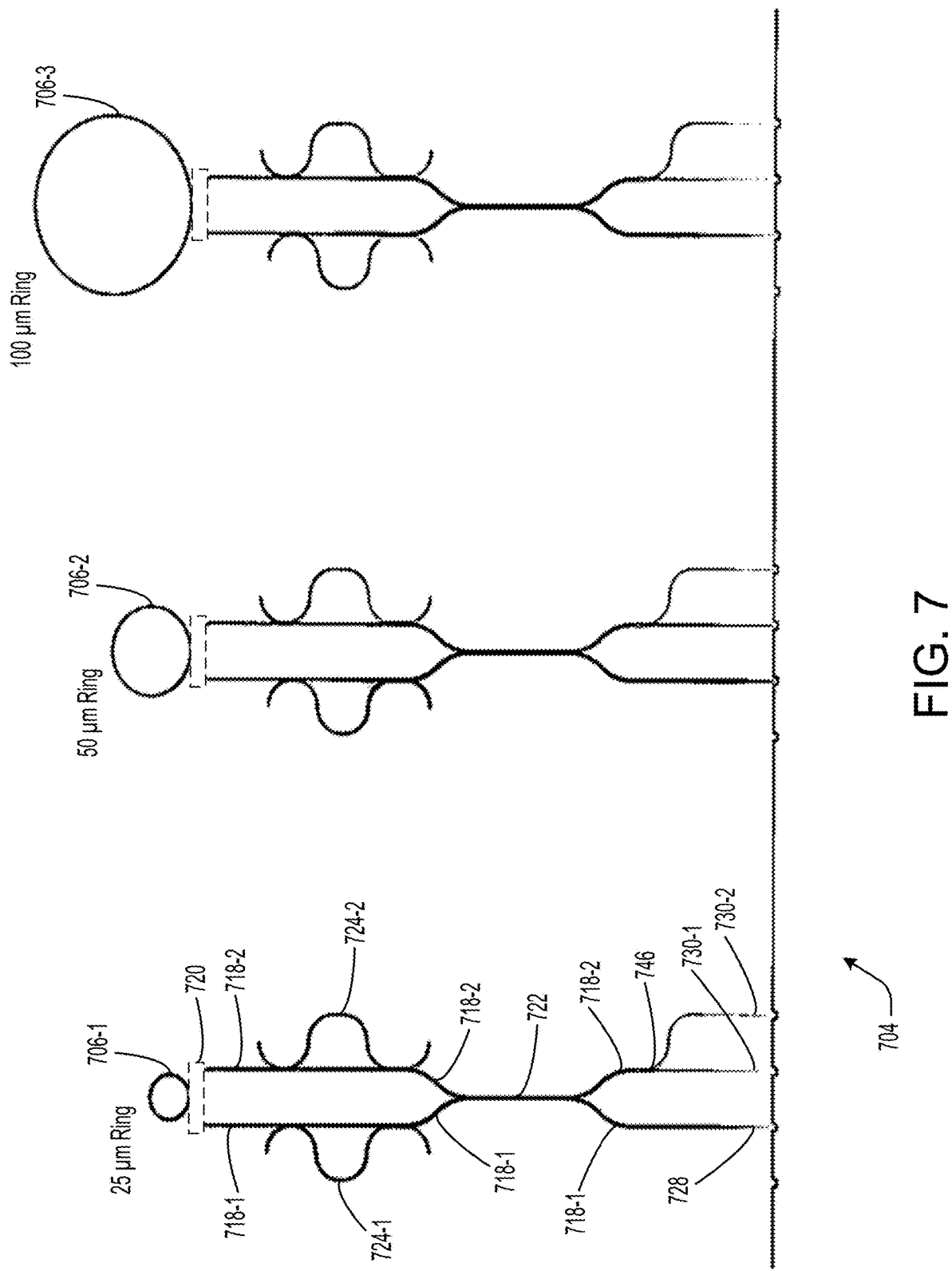
FIG. 7 illustrates a microscope image of an example of a gyroscope having been fabricated with ring resonators and waveguides on the same layer.

In some embodiments, each of spatial phase tilters 224 is formed by bringing two portions (first and second portions) of an additional wave guide in close proximity (e.g., within a threshold distance) to a portion of lower waveguide 218-1 or upper waveguide 218-2 (as shown in FIG. 7). In one implementation, the first portion of the additional waveguide (the portion closest to beam splitter 222) may form a gap of 0.3 μm with the first or second waveguides and have a length of 40 μm and the second portion of the additional waveguide (the portion closest to ring resonator 206) may form a gap of 0.5 μm with the first or second waveguides and have a length of 6 μm.

WMA readout structure 208 may include one or more coupling point(s) 220 for coupling the light in lower waveguide 218-1 and upper waveguide 218-2 traveling in the forward direction into ring resonator 206. Additionally, the light circling ring resonator 206 may be coupled into lower waveguide 218-1 and upper waveguide 218-2, in the reverse direction. As such, the light traveling in waveguides 218 in the forward direction that is coupled into ring resonator 206 may be coupled back into waveguides 218 in the reverse direction. In some embodiments, coupling point(s) 220 are formed by providing evanescent coupling (or evanescent-wave coupling) between waveguide 218 and the waveguide forming ring resonator 206. In such embodiments, waveguides 218 may be considered to be evanescently coupled to the waveguide forming ring resonator 206. As noted above, this can be accomplished by bringing one or more portions of waveguides 218 in close proximity (e.g., within a threshold distance) to a portion of the waveguide forming ring resonator 206. In one implementation, the gap between ring resonator 206 and coupling point(s) 220 is between 2-10 μm. In one implementation, the waveguide width of ring resonator 206 is 1.05 μm and its radius is 50 μm. In one implementation, the waveguide width of ring resonator 206 is 1.05 μm and its radius is between 2-3 mm.

In some embodiments, WMA readout structure 208 includes a split detector 226 coupled to output port 230 of upper waveguide 218-2. Split detector 226 is configured to receive the output light and detect an intensity difference S between a first lobe and a second lobe of the output light. Due to the $TM_0$ and $TM_1$ modes acquiring opposite tilted phase fronts in waveguides 218, beam splitter 222 causes destructive interference of the $TM_0$ mode and enhances the relative contribution of the $TM_1$ mode in the output light. Accordingly, a significant portion of the detectable power in the output light resides in the information-containing $TM_1$ mode. In some embodiments, upper waveguide 218-2 may include a multi-mode splitter that splits upper waveguide 218-2 into two separate output ports. In such embodiments, split detector 226 may be configured to receive the output light from both output ports.

FIG. 2B shows the effect of ring resonator 206 and WMA readout structure 208 on the waveguide modes and the phases of light 236 propagating through gyroscope 204. In the illustrated example, light 236-1 having a $TE_0$ mode is input into lower waveguide 218-1 at input port 228. Light 236-1 propagates down lower waveguide 218-1 in the forward direction until reaching beam splitter 222, where it is split (e.g., in a 50/50 split) into light 236-2 propagating down lower waveguide 218-1 in the forward direction and light 236-3 propagating down upper waveguide 218-2 in the forward direction. Each of light 236-2 and light 236-3 includes the $TE_0$ mode.

Light 236-2 reaches lower spatial phase tilter 224-1 and passes therethrough, resulting in light 236-4 propagating down lower waveguide 218-1 in the forward direction and having the $TE_0$ mode, and similarly light 236-3 reaches upper spatial phase tilter 224-2 and passes therethrough, resulting in light 236-5 propagating down upper waveguide 218-2 in the forward direction and having the $TE_0$ mode. In some embodiments, spatial phase tilter's 224 may be designed to have negligible effect on light passing therethrough in the forward direction.

Light 236-4, which is traveling in lower waveguide 218-1 in the forward direction, couples into ring resonator 206 through evanescent coupling at one of coupling point(s) 220 to become either light 236-7, which repeatedly circles ring resonator 206 in the clockwise direction, or light 236-8, which repeatedly circles ring resonator 206 in the counterclockwise direction, depending on the configuration of coupling point(s) 220. After multiple revolutions around ring resonator 206, light 236-7 or light 236-8 couples back into waveguides 218 through evanescent coupling at one of coupling point(s) 220 to become either light 236-9 traveling in lower waveguide 218-1 in the reverse direction or light 236-10 traveling in upper waveguide 218-2 in the reverse direction.

Similarly, light 236-5, which is traveling in upper waveguide 218-2 in the forward direction, couples into ring resonator 206 through evanescent coupling at one of coupling point(s) 220 to become either light 236-7, which repeatedly circles ring resonator 206 in the clockwise direction, or light 236-8, which repeatedly circles ring resonator 206 in the counter-clockwise direction, depending on the configuration of coupling point(s) 220. After multiple revolutions around ring resonator 206, light 236-7 or light 236-8 couples back into waveguides 218 through evanescent coupling at one of coupling point(s) 220 to become either light 236-9 traveling in lower waveguide 218-1 in the reverse direction or light 236-10 traveling in upper waveguide 218-2 in the reverse direction.

Each of light 236-9 and 236-10 have the $TE_0$ mode. Furthermore, if gyroscope 204 is undergoing a rotation, the two will acquire a relative phase shift $\varphi$ that is imparted by ring resonator 206. For example, light 236-9 may have a phase of $-\varphi$ and light 236-10 may have a phase of $+\varphi$. Light 236-9 reaches lower spatial phase tilter 224-1 and passes therethrough, resulting in light 236-11 propagating down lower waveguide 218-1 in the reverse direction and having the $TE_0$ mode and additionally a $TE_1$ mode that is excited by lower spatial phase tilter 224-1. Similarly, light 236-10 reaches upper spatial phase tilter 224-2 and passes therethrough, resulting in light 236-12 propagating down upper waveguide 218-2 in the reverse direction and having the $TE_0$ mode and additionally the $TE_1$ mode that is excited by upper spatial phase tilter 224-2.

Light 236-11 propagates down lower waveguide 218-1 in the reverse direction until reaching beam splitter 222, where it is split (e.g., in a 50/50 split) and a portion thereof becomes light 236-13 propagating down upper waveguide 218-2 in the reverse direction. Similarly, light 236-12 propagates down upper waveguide 218-2 in the reverse direction until reaching beam splitter 222, where it is split (e.g., in a 50/50 split) and a portion thereof becomes light 236-13 propagating down upper waveguide 218-2 in the reverse direction. Light 236-13 is therefore a combination of the portion of light 236-11 and the portion of light 236-12. The combination of these two light signals causes destructive interference of the base $TE_0$ mode, leaving behind a small portion of the $TE_0$ mode that is proportional to the phase shift $\varphi$. The combination further causes constructive interference of the $TE_1$ mode, such that light 236-13 further includes the $TE_1$ mode.

An analysis of the device geometry of gyroscope 204 follows. It is noted that the mode structure of the traveling electro-magnetic fields is given by the solution to the equation $$\nabla^2 E + n(\omega)^2 k_0^2 E = 0$$

where E is the time and space dependent electric field, $k_0$ is the wavenumber of the light, and $n(\omega)$ is the frequency-dependent index of refraction. Letting z be the direction of propagation, x,y are the transverse directions. The general traveling wave solution takes the form $$E = E_0(x, y) e^{i(\beta z - \omega t)}$$

where $\beta$ is the speed of the wave. The transverse solution then solves the prior equation, which gives an eigenvalue equation for the transverse wave-number k, and relates it to the propagation speed $\beta$.

The effect of the beam-splitter operation with two incoming and two outgoing waveguides can be modeled by defining the incoming electric field modes $\varphi_L$ and $\varphi_R$, where time and space dependence are suppressed for simplicity. By considering the symmetric and anti-symmetric combinations of those modes, $$\varphi_{s,a} = (\varphi_L \pm \varphi_R)/\sqrt{2}$$

these correspond to the eigenstates of the combined modes for a symmetric situation, and these symmetric and anti-symmetric modes travel with speeds $\beta_{s,a}$ that are different from each other.

Considering any combination of the symmetric and anti-symmetric modes, $E = c_s \varphi_s + c_a \varphi_a$, where $c_{s,a}$ are complex coefficients, after propagating some distance $z=L$, corresponding to the coupling region of the two waveguides, the new electric field is $$E' = c_s e^{i\beta s L} \varphi_s + c_a e^{i\beta a L} \varphi_a$$

and thus acquire a relative phase. Writing the result back in terms of the left/right basis states and discarding an overall phase, the result is $E_f = c_R \varphi_R + c_L \varphi_L$, where $$c_{R,L} = (e^{iL\Delta\beta} \pm -e^{iL\Delta\beta})/2$$

where $\Delta\beta = \beta a - \beta s$. This may be written as $c_R = i \sin(L\Delta\beta/2)$ and $C_L = \cos(L\Delta\beta/2)$. More generally, this process can be considered to be a beam splitter-type relation of the form $$\begin{pmatrix} E01 \\ E02 \end{pmatrix} = \begin{pmatrix} t & k \\ -k & t* \end{pmatrix} \begin{pmatrix} Ei1 \\ Ei2 \end{pmatrix}$$

where $E_{i1,2}$ are the input electric fields, and $E_{O1,2}$ are the output electric fields of the waveguides. The complex coefficients k, t may obey the relation $|k|^2 + |t|^2 = 1$ to insure uniformity.

Considering a coupling point between a waveguide and the ring resonator, the combined system can be solved by applying the above general result together with boundary conditions linking the output of one scattering waveguide to the input of another as $$E_{t2} = \alpha e^{i(\theta \pm \varphi)} E_{i2}$$

where $\alpha$ accounts for the loss per cycle, the net phase shift is given by $\theta = 2\pi L/\lambda$, which is the geometric phase (where L is the diameter of the ring), and $\varphi = 2\pi l/\lambda$, where l accounts for the Sagnac effect via $l = 2A\Omega/c$, where A is the area of the ring, $\Omega$ is the angular frequency of rotation, and c is the speed of light. The plus or minus sign on the phase $\varphi$ depends on whether the direction of the light propagation is with or against the rotation of the ring.

If the light is incident (i) from either the left (L) or the right (R), the electric field of the light exiting from the ring (t) in the same direction can be found with some algebra to give $$E_t^{L,R} = (-\alpha + te^{-i(\theta \pm \varphi)})/(-t*\alpha + e^{-i(\theta \pm \varphi)})E_i^{L,R}$$

In the interferometric geometry, these fields will be combined. The quality factor Q of the ring resonator can be calculated from the given parameters of the problem in the case of no rotation. It is noted that the power transmitted (related to the squared absolute value of the electric field) will ideally drop to zero at the resonance condition, $\cos(\theta)=1$, since all the power will go into the ring. This corresponds to an integer number of wavelengths of the light fitting inside the ring. Ideally, both $\alpha$ and t would approach 1. Deviations from this limit will give the ring resonator a finite Q value. It can be expanded $\cos(\theta) \approx 1-(\theta-\theta_0)^2/2$ near the resonance condition (set by $\theta=\theta_0$).

The power inside the ring can be focused on for simplicity to see the Lorentzian behavior, which is the incident power $P_{in}$ minus the power transmitted. After some simplification, it can be found that $$P_{ring} = (1-t^2)(1-\alpha^2)/(1-\alpha t)^2 + \alpha t(\theta-\theta_0)^2 P_{in}$$

If the frequency of the light is detuned by an amount $\delta_\omega = \omega - \omega_n$, from the resonant frequency $\omega_n$, then the phase is $\theta = \delta_\omega L/c$. The quality factor Q is defined by the ratio between the resonance frequency $\omega_n$ and the width of the resonance $\Delta\omega$, defined by the Lorentzian shape, $Q=\omega_n/\Delta\omega$.

The width can be defined as when the two terms in the denominator of the previous equation are equal, and therefore $$\Delta\omega = (1-\alpha t)c/(\sqrt{\alpha t}L)$$

giving the quality factor of $$Q = (2\pi)^2 R\sqrt{\alpha t}/\lambda_n(1-\alpha t)$$

where $\lambda_n$ is the resonance wavelength. This result has been checked in numerical simulations with an under coupled case of $\alpha=0.95$, $t=0.98$, $R=100$ μm, $\lambda=1.55$ μm, giving a Q factor of $3.5 \times 10^4$. A second set of parameters for critical coupling was chosen to be $\alpha=t=0.95$ and the same values for $\lambda$, R. A quality factor of $2.47 \times 10^4$ is found. Both results are in good agreement with numerical simulations.

Next, the phase sensitivity of the field for value of t,$\alpha$ near one will be explored. It is assumed that the acquired phase shift $\varphi$ is the smallest parameter in the problem to be sensitive to small rotations. The deviation parameters are defined as $\delta t = 1-t$, $\delta\alpha = 1-\alpha$, where it is assumed that $\delta t$, $\delta\alpha$ are small parameters in an expansion. After expansion in these parameters, it is found that the resulting electric fields are $$E_t^{L,R} = 1/(\delta\alpha + \delta t)[\delta\alpha - \delta t + (2\delta t(-i(\theta \mp \varphi) + (1/2)(\theta \mp \varphi)^2)/(\delta\alpha - \delta t) + \ldots]E_t^{L,R}$$

When the system is on-resonance and there is no rotation, the power coming out of the ring is $$P_{out}(\delta\alpha - \delta t/\delta\alpha + \delta t)^2 P_{in}$$

and thus vanishes if the ring is critically coupled $\alpha=t$, as is verified in the numerical simulations.

It can be seen that the phase shift of the light, depending on direction, is given by $$\Theta_{L,R} = -(\theta \mp \varphi)(2\delta t/(\delta\alpha)2 - (\delta t)^2)$$

This leads to a difficulty in that when the phase amplification is the greatest, the ring is critically coupled, but that is also when no light emerges from the ring. If the ring is resonantly coupled, then the intensity variation between the left and right modes is purely quadratic versus $\varphi$, so there is very little variation. The intensity variation with phase is always quadratic, so long as the coupling is not critical, so the magnitude change can be neglected in this limit. The signal-to-noise ratio can be estimated for such a system. The electric fields can be re-exponentiated, so they are approximately given by $E_{L,R} = E_0 e^{-i\Theta_{L,R}}$, where $E_0 = E_{in}(\delta\alpha - \delta t)/(\delta\alpha + \delta t)$. Looking at the fundamental limits, the sum and difference at a beam-splitter (adding in a phase of $\pi/2$ on one arm) can be taken to get a total intensity in both arms of a Mach-Zehnder interferometer of $$I_{1,2} = I_0(1 \pm \sin(2C_\varphi))/2$$

where $C = 2\delta t/(\delta\alpha^2 - \delta t^2)$ is the phase amplification, and $I_0 = E_0^2$.

Since the phase is small, the difference can be taken as the measured signal, so the information signal is approximately given by $$I_1 - I_2 = 2CI_0\varphi$$

Consequently, the signal-to-noise ratio R is given by $$R = \sqrt{N}(4|\delta\alpha - \delta t|\delta t)/(\delta\alpha + \delta t)^3)\varphi$$

where N is the number of photons in the system. Note that if the system is critically coupled, then the SNR goes to zero. However, the SNR can be increased by avoiding critical coupling. For example, if both $\delta t$, $\delta\alpha$ are similar small numbers $\varepsilon$, then the SNR scales with R~$1/\varepsilon$, which is expected for a regular ring, where the pre-factor is a number of order 1. In some cases, it is desirable to keep $\delta t$ small and finite, while letting $\delta\alpha$ go to 0, which may correspond to the over-coupled case with an SNR of $R = 4\sqrt{N}/\delta t$. Since the quality factor in that case is $Q=(2\pi)^2 R/(\delta t \lambda)$, the best case SNR can be written in terms of quality factor (in the limit of a lossless ring) as $$R = (\sqrt{N(Q\lambda)/(\pi^2 R)})\varphi$$

This corresponds to a minimal phase resolution found by setting the SNR=1, and solving for the smallest detectable phase to yield $$\varphi_{min} = \pi^2 R/(\sqrt{NQ\lambda})$$

This can be converted into a minimal angular frequency relation via the Sagnac relation, $$\Omega_{min} = c/(4RQ\sqrt{N})$$

where the area $A=\pi R^2$. Thus, the best case scenario is to maximize the product of the radius of the ring times its quality factor.

Figure 3:
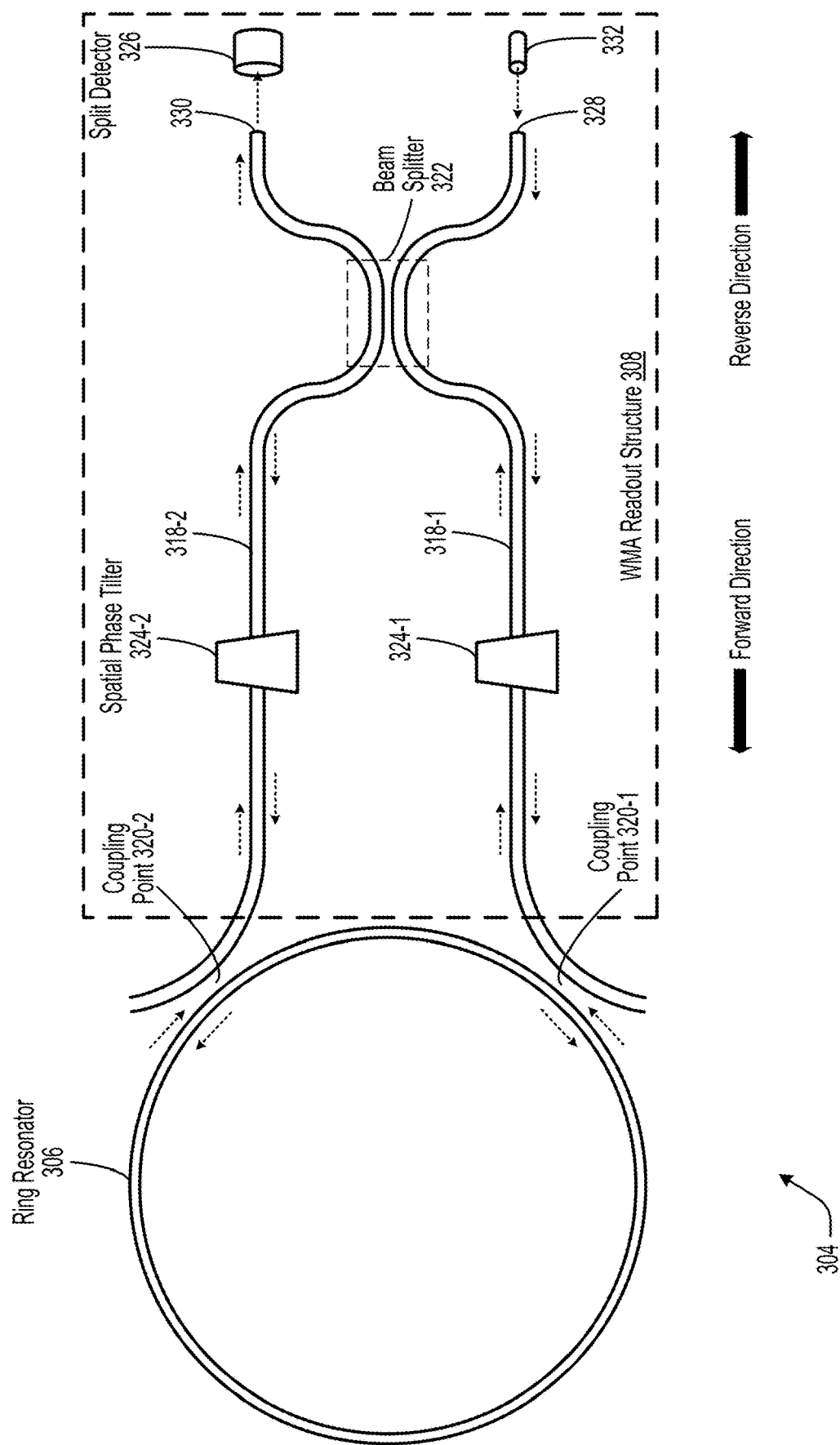
FIG. 3 illustrates an example architecture of a gyroscope.

FIG. 3 illustrates an example architecture of a gyroscope 304, according to some embodiments of the present invention. Gyroscope 304 is similar to gyroscope 204 described in reference to FIGS. 2A and 2B. For example, gyroscope 304 includes a ring resonator 306, a WMA readout structure 308, waveguides 318, a beam splitter 322, spatial phase tilter(s) 324, a split detector 326, an input port 328, an output port 330, and light source 332. WMA readout structure 308 may further include a two coupling points 320 along waveguides 318 where light in waveguides 318 traveling in the forward direction is coupled into ring resonator 306 and light circling ring resonator 306 is coupled back into waveguides 318 in the reverse direction. Coupling points 320 include a lower coupling point 320-1, where lower waveguide 318-1 is evanescently coupled to ring resonator 306, and an upper coupling point 320-2, where upper waveguide 318-2 is evanescently coupled to ring resonator 306. Waveguides 318 remain unconnected in gyroscope 304.

Figure 4:
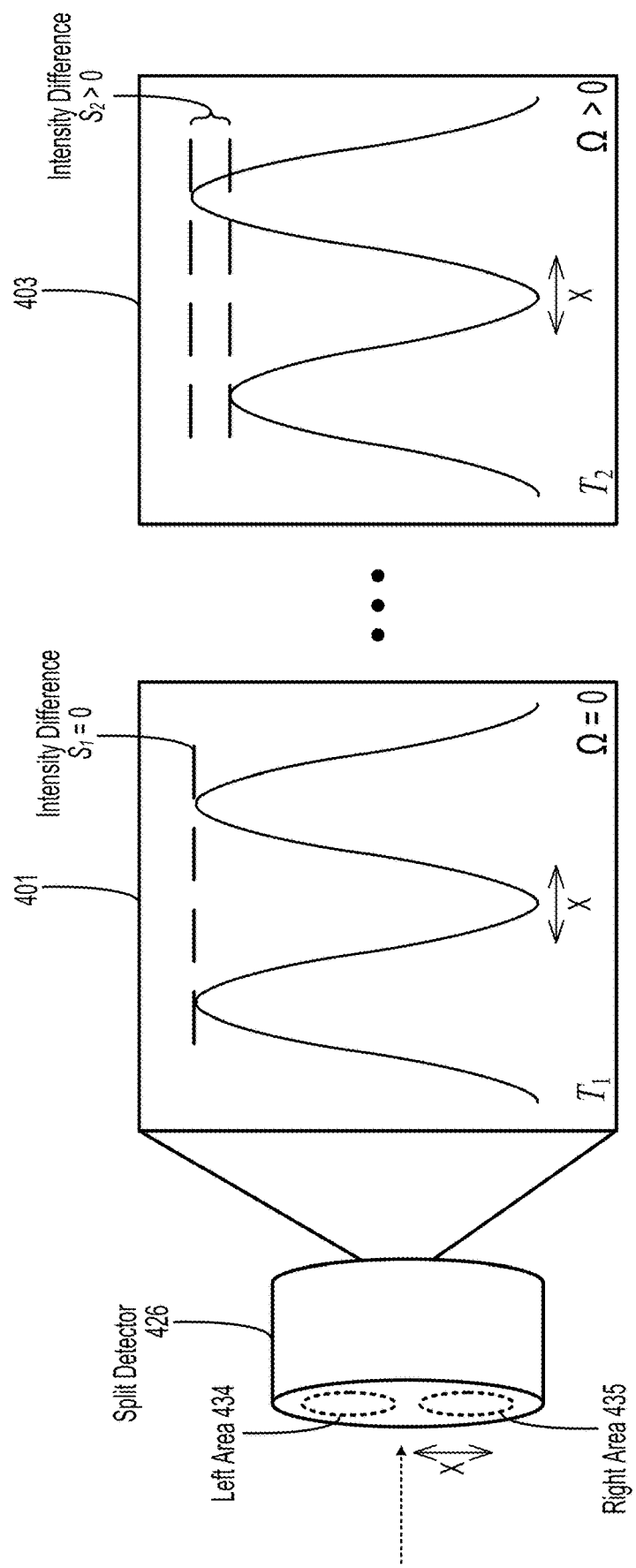
FIG. 4 illustrates an example of detecting an intensity difference of output light at a split detector.

FIG. 4 illustrates an example of a detection of the intensity difference S of the output light by split detector 426, according to some embodiments of the present invention. In some embodiments, the intensity difference S may be calculated as $S=I_R-I_L$, where $I_R$ is the intensity of the right half of the waveguide and $I_L$ is the intensity of the left half of the waveguide. In some embodiments, the intensity difference S may be calculated as $S=(I_R-I_L)/(I_R+I_L)$. Split detector 426 may include a left area 434 and a right area 435 for detecting intensities $I_L$ and $I_R$, respectively. In some embodiments, the intensity difference S may be a function of the phase shift $\varphi$. Upon solving for the phase shift $\varphi$, the rotation $\Omega$ of the gyroscope may be calculated. In the illustrated embodiment, an intensity difference of $S_1=0$ detected at time $T_1$ is shown in profile 401, and an intensity difference of $S_2>0$ detected at time $T_2$ is shown in profile 403.

Figure 5:
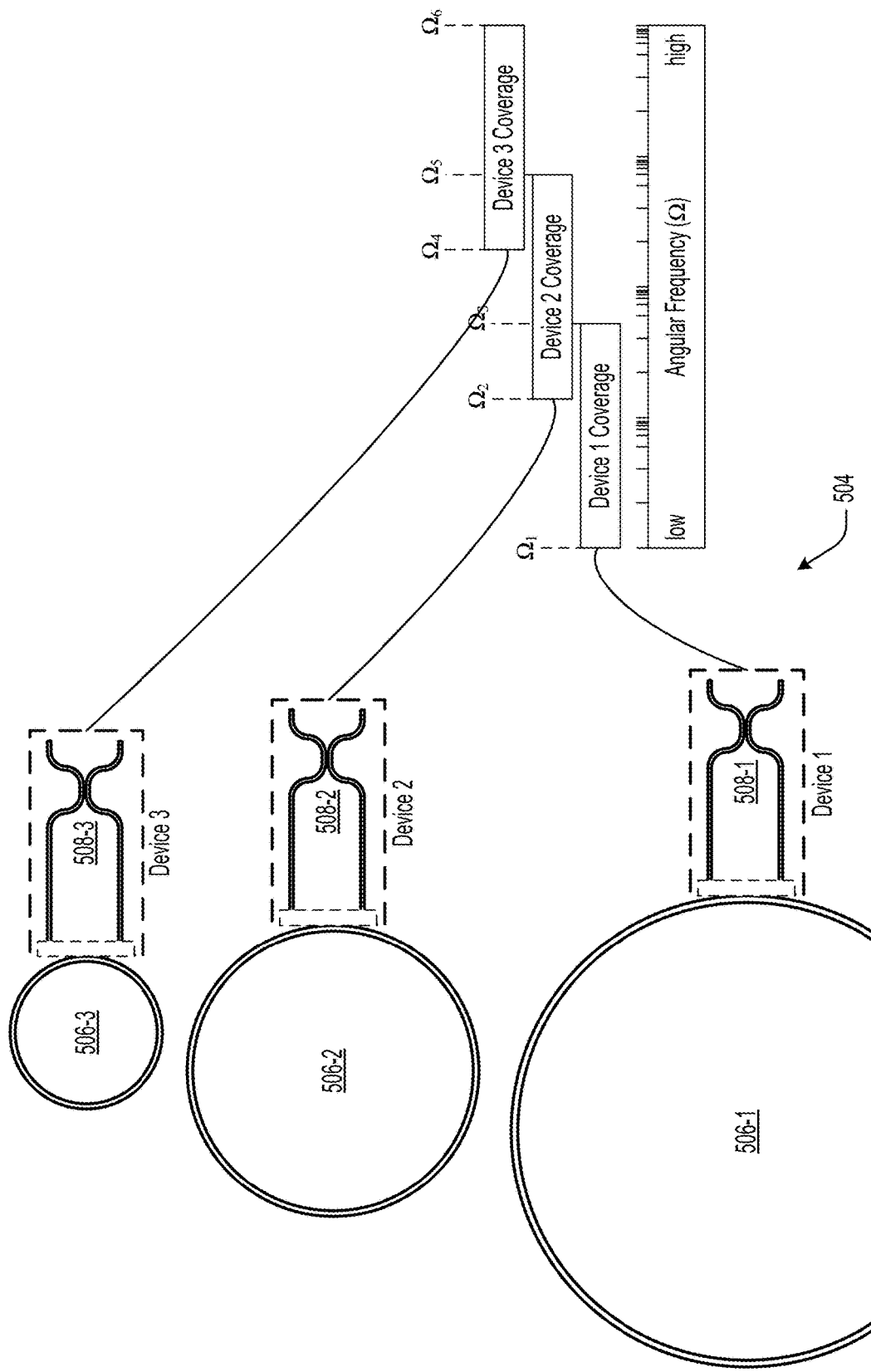
FIG. 5 illustrates an example of a gyroscope that includes multiple sets of ring resonators and WMA readout structures.

FIG. 5 illustrates an example of a gyroscope 504 (alternatively referred to as a photonic device) that includes multiple sets of ring resonators 506 and WMA readout structures 508, according to some embodiments of the present invention. FIG. 5 shows how a gyroscope (or photonic device) can be fabricated using the described techniques to be sensitive to different scales of rotation. In some instances, as the ring resonator becomes larger and has a higher quality, the device's sensitivity to the rotation increases and the dynamic range decreases. As such, different ring resonators can be used to cover different frequency ranges. For example, Device 1 can be used for detecting angular frequencies between $\Omega_1$ and $\Omega_2$, both Devices 1 and 2 can be used to detect frequencies between $\Omega_2$ and $\Omega_3$, Device 2 can be used to detect frequencies between $\Omega_3$ and $\Omega_4$, both Devices 2 and 3 can be used to detect frequencies between $\Omega_4$ and $\Omega_5$, and Device 3 can be used to detect frequencies between $\Omega_5$ and $\Omega_6$. A controller that is electrically coupled to gyroscope 504 may be configured to switch between the devices based on which of these ranges the detected angular frequency falls within.

A rotation of an optical loop, oriented in the direction of rotation gives rise to the Sagnac effect, whereby a relative phase $\varphi$ appears because of the rotation rate $\Omega$. Physically this phase shift can be seen as a relative delay/advance of the two propagating waves. Given an optical wavelength $\lambda$ and a loop area A, it is given by $$\varphi_{min} = \frac{8\pi A}{\lambda c}\Omega$$

where c is the speed of light in vacuum.

Normally, dynamic range is bounded by the fact the phase $\varphi$ will wrap around $2\pi$, so the device will give the same output for $\Omega$ and for $\Omega+2\pi(\lambda c/(8\pi A))$. Consequently, without tracking the history of the signal, this can lead to multi-valued ambiguity problems. However, for weak value type amplification experiments, the conditions for the validity of the approximations of the analysis are also obeyed, which are also necessary for the linear response of the device with respect to phase. The condition $\varphi \ll \kappa \ll 1$ is also obeyed, where $\kappa$ is the admixture of the first mode. In typical experiments, $\kappa$ is expected to be between $1/100$ and $1/10$, so the dynamic range can be considered to be $\varphi<10^{-2}$ in some embodiments. In addition, the fact may be considered that the acquired phase is not just the Sagnac phase, but has an additional enhancement of $1/\delta t$, where $\delta t$ is the deviation of the ring transmission coefficient from 1, leading to many cycles of the light around the ring. A typical value can be $\delta t=10^{-2}$. This further reduces the dynamic range to stay in the weak value approximation by a combined factor of $10^{-4}$.

In some embodiments, a wavelength of $\lambda=1500$ nm may be considered. In this case, the dynamic range of the detector is $$\Omega_{dr} = 0.00059/r^2 \text{ rad m}^2/\text{s}$$

If a large ring radius of 3 cm is included, that gives a dynamic range of 0.65 rad/s, which is about 40 degrees a second, which is fairly large. By making the radius smaller, it can be seen from the previous equation that the dynamic range can be made much larger. This suggests making a number of devices of varying sizes. By increasing the radius of the device on a logarithmic scale, the dynamic range can increase logarithmically. This can correspond to mapping out the "digits" of a large angular velocity, where the smallest rings measure the largest digits, and the largest rings measure the smallest digits. The dependence on radius is quadratic, so small changes in radius can correspond to significant changes in angular velocity.

Figure 6:
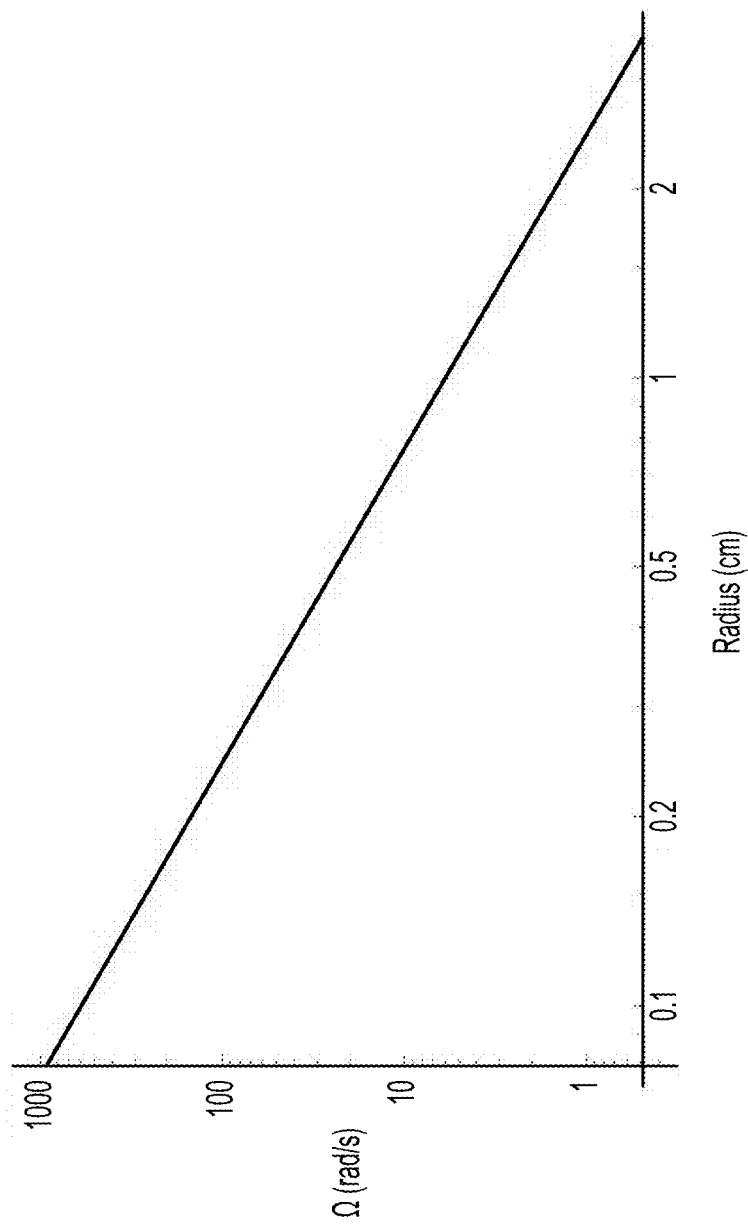
FIG. 6 illustrates a plot of the dynamic range of the angular velocity of a gyro device versus ring radius.

FIG. 6 illustrates a log-log plot of the dynamic range of the angular velocity (in rad/s) of a gyro device versus ring radius (in cm), according to some embodiments of the present invention. As shown in FIG. 6, three decades of angular velocity can be covered with ring radii between just less than 1 mm to 3 cm. For example, the table below shows different selected ring radii to hit each digit of the dynamic range.

| $\Omega_{dr}$ (rad/s) | 1 | 10 | 100 | 1000 |
|---|---|---|---|---|
| r (cm) | 2.4 | 0.76 | 0.24 | 0.077 |

FIG. 7 illustrates a microscope image of an example of a gyroscope 704 (alternatively referred to as a photonic device) having been fabricated with ring resonators 706 and the various waveguides on the same layer, according to some embodiments of the present invention. Each of the three sets of structures of gyroscope 704 (with each structure including one of ring resonators 706 and a corresponding WMA readout structure) may be similar to gyroscope 204 described in reference to FIGS. 2A and 2B and gyroscope 304 described in reference to FIG. 3. For example, each of the structures may include a ring resonator 706 (being either 25 μm, 50 μm, or 100 μm as indicated in FIG. 7), waveguides 718, a beam splitter 722, spatial phase tilter(s) 724 (also referred to as phase front tilters), and an input port 728.

Each of the WMA readout structures may also include a multimode splitter 746 positioned at upper waveguide 718-2 that performs multi-mode splitting, resulting in a lower output port 730-1 and an upper output port 730-2. Each of the WMA readout structures further includes one or more coupling points 720 along waveguides 718 where light in waveguides 718 traveling in the forward direction is coupled into ring resonator 706 and light circling ring resonator 706 is coupled back into waveguides 718 in the reverse direction.

Figure 8:
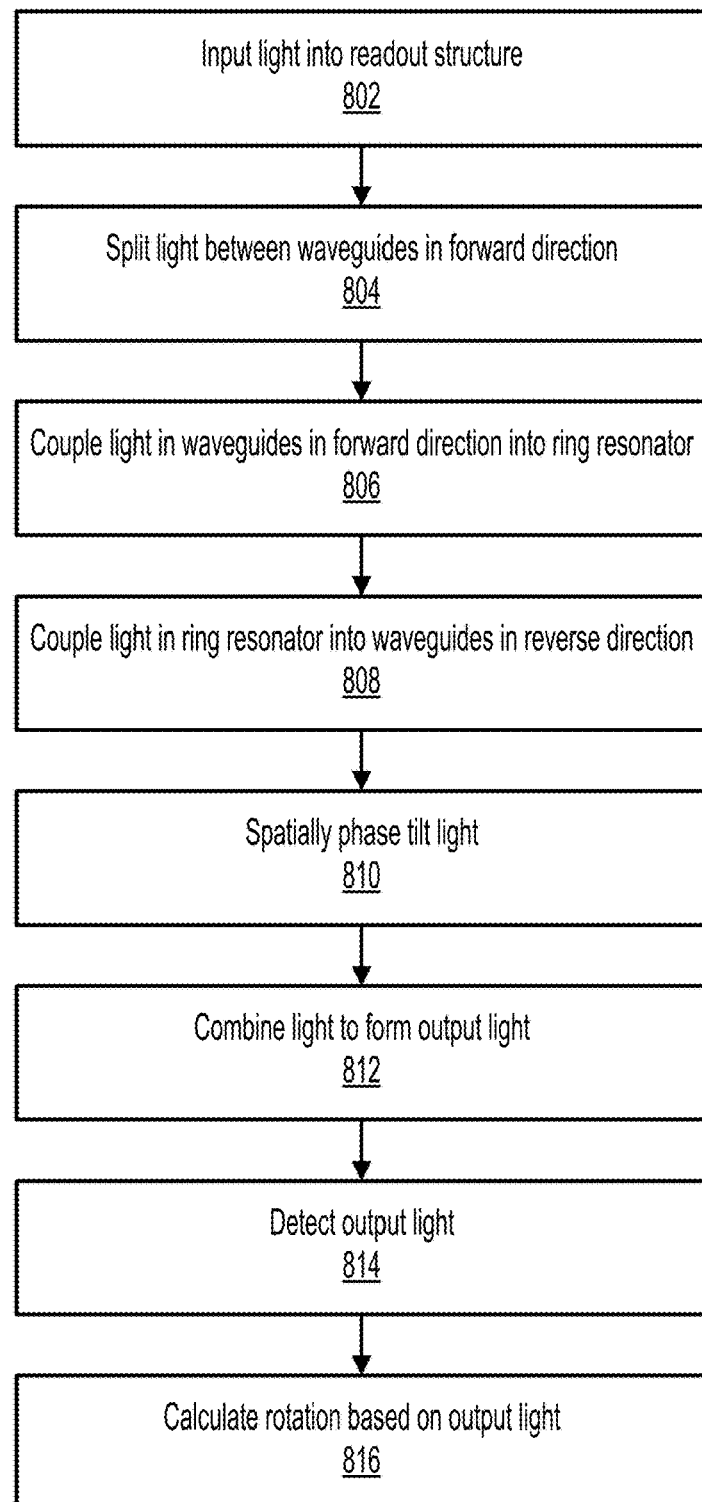
FIG. 8 illustrates an example of a method for detecting a rotation of a photonic device.

FIG. 8 illustrates an example of a method 800 for detecting a rotation of a photonic device (e.g., gyroscopes 204, 304, 704), according to some embodiments of the present invention. One or more steps of method 800 may be omitted during performance of method 800, and steps of method 800 need not be performed in the order shown. One or more steps of method 800 may be performed by one or more processors, such as those included in an IMU (e.g., IMU 100). Method 800 may be implemented as a computer-readable medium or computer program product comprising instructions which, when the program is executed by one or more computers, cause the one or more computers to carry out the steps of method 800. Such computer program products can be transmitted, over a wired or wireless network, in a data carrier signal carrying the computer program product.

At step 802, light (e.g., light 236) is input into a readout structure (e.g., readout structures 108, 208, 308, 608). In some embodiments, the light may be input at an input port (e.g., input ports 228, 328) of a lower waveguide (e.g., lower waveguides 218-1, 318-1) of the readout structure. In some embodiments, the light may include a TE$_0$ mode.

At step 804, the light is split between the lower waveguide and an upper waveguide (e.g., upper waveguides 218-2, 318-2, 718-2) of the readout structure and travels in a forward direction. In some embodiments the light may be split by a beam splitter (e.g., beam splitters 222, 322, 722).

At step 806, the light in the lower waveguide traveling in the forward direction and the light in the upper waveguide traveling in the forward direction are coupled into a ring resonator (e.g., ring resonators 106, 206, 306, 506, 706) at one or more coupling points (e.g., coupling points 220, 320, 720). The one or more coupling points may support evanescent coupling between the waveguides and the ring resonator. In some embodiments, the one or more coupling points may include a single coupling point at which the lower waveguide and the upper waveguide are connected. In some embodiments the one or more coupling points may include two coupling points, and the lower waveguide and the upper waveguide may remain unconnected.

At step 808, the light in the ring resonator is coupled back into the lower waveguide and the upper waveguide in a reverse direction at the one or more coupling points. In some embodiments, the light in the ring resonator may be coupled back into the waveguides after the light has circled the ring resonator during multiple revolutions. In some embodiments, a portion of the light may circle the ring resonator in the clockwise direction and another portion of the light may circle the ring resonator in the counter-clockwise direction. In some embodiments, due to rotation of the gyroscope, the ring resonator imparts a relative phase shift between the light traveling in the clockwise direction and the light traveling in the counter-clockwise direction, which is continued with the light in the lower waveguide traveling in the reverse direction and the light in the upper waveguide traveling in the reverse direction.

At step 810, one or both of the light in the lower waveguide and the light in the upper waveguide are spatially phase tilted by one or more spatial phase tilters (e.g., spatial phase tilters 224, 324, 724). In some embodiments, one or both of the light the lower waveguide traveling in the reverse direction and the light in the upper waveguide traveling in the reverse direction may be spatially phase tilted. In some embodiments, the one or more spatial phase tilters may include a lower spatial phase tilter formed on the lower waveguide and/or an upper spatial phase tilter formed on the upper waveguide. In some embodiments, the one or more spatial phase tilters may excite a TE$_1$ mode to the light passing therethrough.

At step 812, the light in the lower waveguide traveling in the reverse direction and the light in the upper waveguide traveling in the reverse direction are combined to form output light. In some embodiments, the two light signals are combined at the beam splitter. In some embodiments, combining the light causes destructive interference of the base TE$_0$ mode and/or constructive interference of the TE$_1$ mode.

At step 814, the output light is detected. In some embodiments the output light may be detected using a split detector (e.g., split detectors 226, 326).

At step 816, the rotation of the photonic device is calculated based on the output light. In some embodiments, the rotation is calculated based on an analysis of the output light that includes determining an intensity difference between a first lobe and a second lobe of the output light.

FIG. 9 illustrates a table showing experimental results for a gyroscope, according to some embodiments of the present invention. The illustrated results were achieved using a fabricated gyroscope having a 50 μm ring radius. Results are shown for the following parameters: sensitivity, temperature stability, repeatability, angle random walk (ARW), bias stability, and precision. When compared to theoretical predictions (not shown), the experimental results demonstrate the excellent performance of the gyroscope across several measured parameters.

FIG. 10 illustrates a table showing a comparison between experimental results achieved for a gyroscope of the present invention and conventional approaches. The WMA gyro, as described herein, having a ring radius of 30 mm was compared to the Brillion Ring Laser Gyroscope (RLG) having a ring radius of 36 mm and the milli-Hemispherical Resonator Gyroscope (m-HRG). As shown in the illustrated table, the WMA gyro had a measured ARW and bias stability that were significantly better than those measured for the Brillion RLG and the m-HRG, in some cases, by several orders of magnitude.

Figure 11:
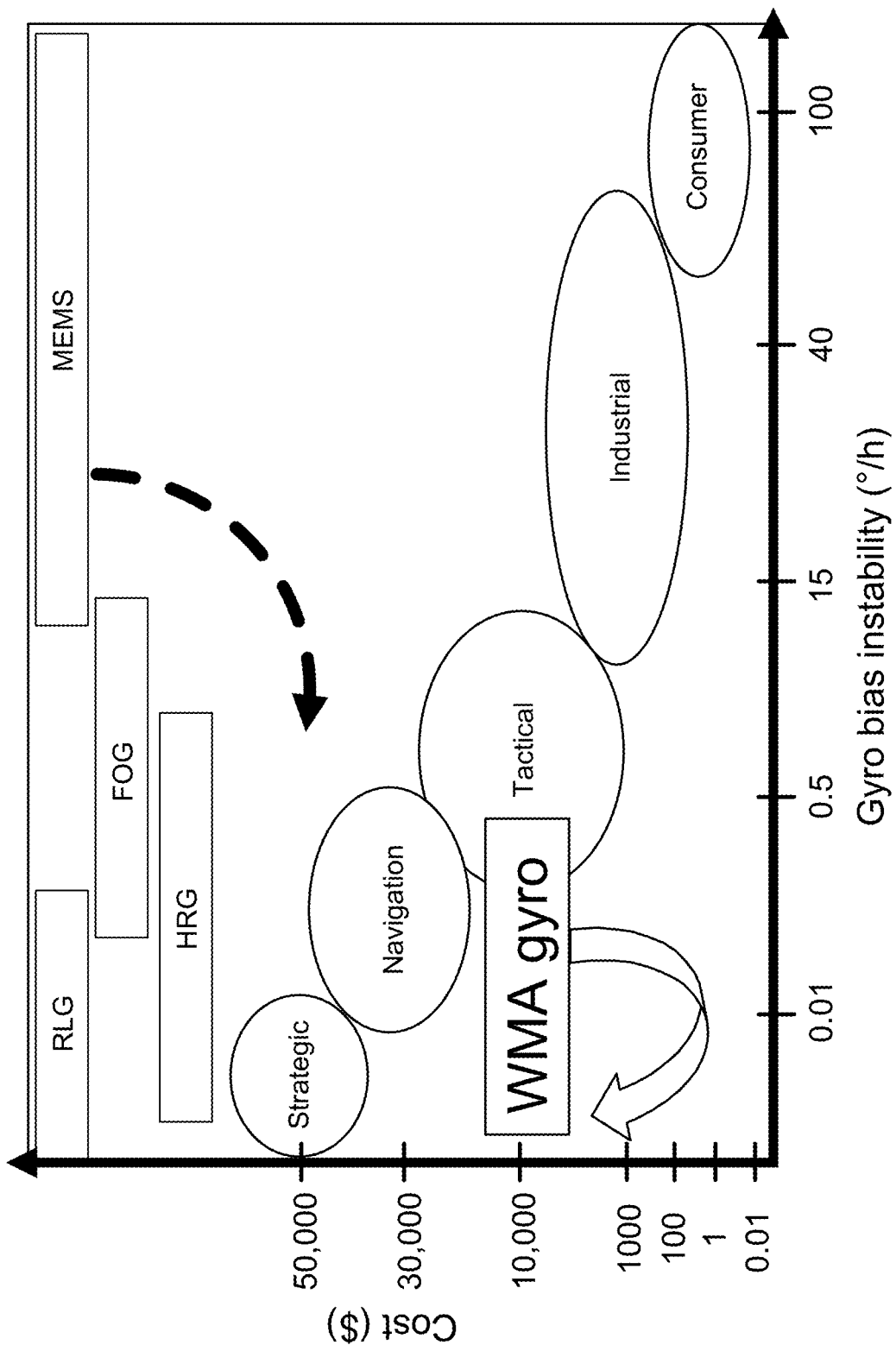
FIG. 11 illustrates a plot showing the performance and cost of a gyroscope of the present invention compared to conventional approaches.

FIG. 11 illustrates a plot showing the performance and cost of a gyroscope of the present invention compared to conventional approaches. The WMA gyro, as described herein, was compared to conventional approaches (shown in rectangular boxes) in terms of gyro bias instability and cost. Also shown (in ovals) are the requirements for several applications, such as consumer (requiring a bias stability between approximately 50 to 1000°/h), industrial (requiring a bias stability between approximately 2 to 50°/h), tactical (requiring a bias stability between approximately 0.1 to 10°/h), navigation (requiring a bias stability between approximately 0.01 to 0.5°/h), and strategic (requiring a bias stability between approximately less than 0.1°/h). As shown in FIG. 11, the WMA gyro has better gyro bias instability than many conventional techniques and can cost significantly less to fabricate.

FIG. 12 illustrates a table showing design parameters of a gyroscope of the present invention and predicted performance for various applications. The design parameters include input power (in mW), radius (in mm), and Q-factor. The applications include dismount FWS-I, dismounts (NF/NK), ground vehicle EO/IR, drone navigation, airborne navigating, and strategic navigation. Based on the values provided for the design parameters on the left side of the table, the performance values on the right side of the table were predicted for angle random walk, precision, bias stability, and dynamic range.

Figure 13:
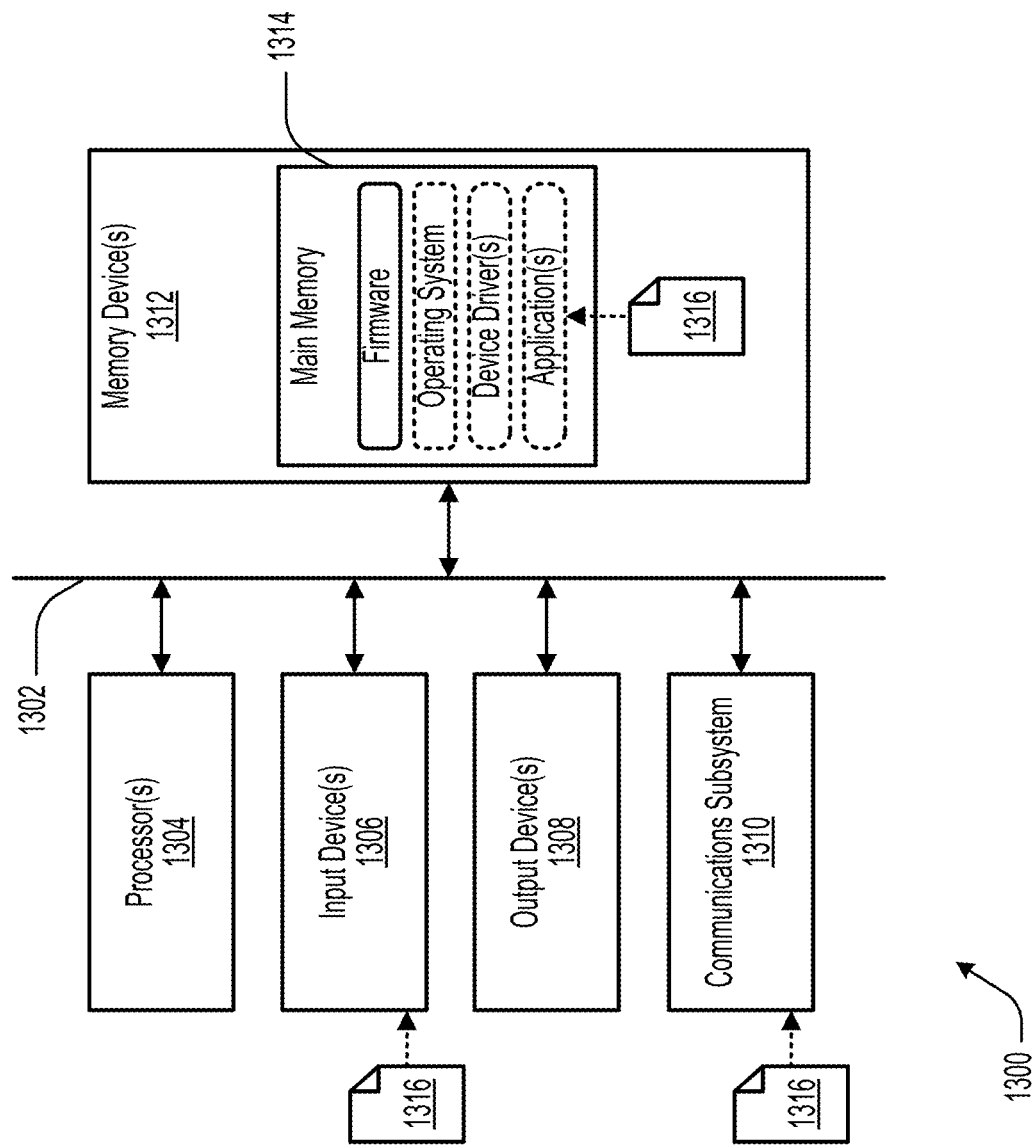
FIG. 13 illustrates an example computer system comprising various hardware elements.

FIG. 13 illustrates an example computer system 1300 comprising various hardware elements, according to some embodiments of the present invention. Computer system 1300 may be incorporated into or integrated with devices described herein and/or may be configured to perform some or all of the steps of the methods provided by various embodiments. For example, in various embodiments, computer system 1300 may be incorporated into or operated in conjunction with gyroscopes 204, 304, 504, and/or 704, and/or may be configured to perform or initiate method 800. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

In the illustrated example, computer system 1300 includes a communication medium 1302, one or more processor(s) 1304, one or more input device(s) 1306, one or more output device(s) 1308, a communications subsystem 1310, and one or more memory device(s) 1312. Computer system 1300 may be implemented using various hardware implementations and embedded system technologies. For example, one or more elements of computer system 1300 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 1300 may be coupled via communication medium 1302. While communication medium 1302 is illustrated as a single connection for purposes of clarity, it should be understood that communication medium 1302 may include various numbers and types of communication media for transferring data between hardware elements. For example, communication medium 1302 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1302 may include one or more buses connecting pins of the hardware elements of computer system 1300. For example, communication medium 1302 may include a bus connecting processor(s) 1304 with main memory 1314, referred to as a system bus, and a bus connecting main memory 1314 with input device(s) 1306 or output device(s) 1308, referred to as an expansion bus. The system bus may consist of several elements, including an address bus, a data bus, and a control bus. The address bus may carry a memory address from processor(s) 1304 to the address bus circuitry associated with main memory 1314 in order for the data bus to access and carry the data contained at the memory address back to processor(s) 1304. The control bus may carry commands from processor(s) 1304 and return status signals from main memory 1314. Each bus may include multiple wires for carrying multiple bits of information and each bus may support serial or parallel transmission of data.

Processor(s) 1304 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 1304 may include one or more multi-core processors, in which each core may read and execute program instructions simultaneously with the other cores.

Input device(s) 1306 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 1306 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1308 may include one or more of various devices that convert information into human-readable form, such as without limitation a display device, a speaker, a printer, and/or the like. Output device(s) 1308 may also include devices for writing to removable storage devices or other removable media, such as those described in reference to input device(s) 1306. Output device(s) 1308 may also include various actuators for causing physical movement of one or more components. Such actuators may be hydraulic, pneumatic, and/or electric, and may be provided with control signals by computer system 1300.

Communications subsystem 1310 may include hardware components for connecting computer system 1300 to systems or devices that are located external computer system 1300, such as over a computer network. In various embodiments, communications subsystem 1310 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1312 may include the various data storage devices of computer system 1300. For example, memory device(s) 1312 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 1304 and memory device(s) 1312 are illustrated as being separate elements, it should be understood that processor(s) 1304 may include varying levels of on-processor memory, such as processor registers and caches that may be utilized by a single processor or shared between multiple processors.

Memory device(s) 1312 may include main memory 1314, which may be directly accessible by processor(s) 1304 via the memory bus of communication medium 1302. For example, processor(s) 1304 may continuously read and execute instructions stored in main memory 1314. As such, various software elements may be loaded into main memory 1314 to be read and executed by processor(s) 1304 as illustrated in FIG. 13. Typically, main memory 1314 is volatile memory, which loses all data when power is turned off and accordingly needs power to preserve stored data. Main memory 1314 may further include a small portion of non-volatile memory containing software (e.g., firmware, such as BIOS) that is used for reading other software stored in memory device(s) 1312 into main memory 1314. In some embodiments, the volatile memory of main memory 1314 is implemented as random-access memory (RAM), such as dynamic RAM (DRAM), and the non-volatile memory of main memory 1314 is implemented as read-only memory (ROM), such as flash memory, erasable programmable read-only memory (EPROM), or electrically erasable programmable read-only memory (EEPROM).

Computer system 1300 may include software elements, shown as being currently located within main memory 1314, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 1316, executable by computer system 1300. In one example, such instructions 1316 may be received by computer system 1300 using communications subsystem 1310 (e.g., via a wireless or wired signal carrying instructions 1316), carried by communication medium 1302 to memory device(s) 1312, stored within memory device(s) 1312, read into main memory 1314, and executed by processor(s) 1304 to perform one or more steps of the described methods. In another example, instructions 1316 may be received by computer system 1300 using input device(s) 1306 (e.g., via a reader for removable media), carried by communication medium 1302 to memory device(s) 1312, stored within memory device(s) 1312, read into main memory 1314, and executed by processor(s) 1304 to perform one or more steps of the described methods.

In some embodiments of the present disclosure, instructions 1316 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 1300. For example, the non-transitory computer-readable medium may be one of memory device(s) 1312, as shown in FIG. 13, with instructions 1316 being stored within memory device(s) 1312. In some cases, the non-transitory computer-readable medium may be separate from computer system 1300. In one example, the non-transitory computer-readable medium may a removable media provided to input device(s) 1306, such as those described in reference to input device(s) 1306, as shown in FIG. 13, with instructions 1316 being provided to input device(s) 1306. In another example, the non-transitory computer-readable medium may a component of a remote electronic device, such as a mobile phone, that may wirelessly transmit a data signal carrying instructions 1316 to computer system 1300 using communications subsystem 1310, as shown in FIG. 13, with instructions 1316 being provided to communications subsystem 1310.

Instructions 1316 may take any suitable form to be read and/or executed by computer system 1300. For example, instructions 1316 may be source code (written in a human-readable programming language such as Java, C, C++, C#, Python), object code, assembly language, machine code, microcode, executable code, and/or the like. In one example, instructions 1316 are provided to computer system 1300 in the form of source code, and a compiler is used to translate instructions 1316 from source code to machine code, which may then be read into main memory 1314 for execution by processor(s) 1304. As another example, instructions 1316 are provided to computer system 1300 in the form of an executable file with machine code that may immediately be read into main memory 1314 for execution by processor(s) 1304. In various examples, instructions 1316 may be provided to computer system 1300 in encrypted or unencrypted form, compressed or uncompressed form, as an installation package or an initialization for a broader software deployment, among other possibilities.

In one aspect of the present disclosure, a system (e.g., computer system 1300) is provided to perform methods in accordance with various embodiments of the present disclosure. For example, some embodiments may include a system comprising one or more processors (e.g., processor(s) 1304) that are communicatively coupled to a non-transitory computer-readable medium (e.g., memory device(s) 1312 or main memory 1314). The non-transitory computer-readable medium may have instructions (e.g., instructions 1316) stored therein that, when executed by the one or more processors, cause the one or more processors to perform the methods described in the various embodiments.

In another aspect of the present disclosure, a computer-program product that includes instructions (e.g., instructions 1316) is provided to perform methods in accordance with various embodiments of the present disclosure. The computer-program product may be tangibly embodied in a non-transitory computer-readable medium (e.g., memory device(s) 1312 or main memory 1314). The instructions may be configured to cause one or more processors (e.g., processor(s) 1304) to perform the methods described in the various embodiments.

In another aspect of the present disclosure, a non-transitory computer-readable medium (e.g., memory device(s) 1312 or main memory 1314) is provided. The non-transitory computer-readable medium may have instructions (e.g., instructions 1316) stored therein that, when executed by one or more processors (e.g., processor(s) 1304), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of detecting a rotation of a photonic device, the method comprising:
 inputting light into a readout structure;
 splitting, at a beam splitter, the light between a lower waveguide and an upper waveguide of the readout structure in a forward direction;
 coupling the light in the lower waveguide traveling in the forward direction and the light in the upper waveguide traveling in the forward direction into a ring resonator at one or more coupling points;
 coupling the light in the ring resonator into the lower waveguide and the upper waveguide in a reverse direction at the one or more coupling points;
 spatially phase tilting, by one or more spatial phase tilters, one or both of the light in the lower waveguide and the light in the upper waveguide;
 combining, at the beam splitter, the light in the lower waveguide traveling in the reverse direction and the light in the upper waveguide traveling in the reverse direction to form output light; and
 detecting the output light, wherein the rotation is calculated based on the output light.

2. The method of claim 1, wherein the one or more coupling points is a single coupling point, and wherein the lower waveguide and the upper waveguide are connected to each other at the single coupling point.

3. The method of claim 1, wherein the one or more coupling points include two coupling points, and wherein the lower waveguide and the upper waveguide are unconnected to each other at either of the two coupling points.

4. The method of claim 1, wherein the beam splitter is formed by positioning a region of the lower waveguide within a threshold distance of a region of the upper waveguide.

5. The method of claim 1, wherein the photonic device includes a light source for generating the light.

6. The method of claim 1, wherein the ring resonator introduces a relative phase shift between the light in the lower waveguide traveling in the reverse direction and the light in the upper waveguide traveling in the reverse direction.

7. The method of claim 1, further comprising calculating the rotation based on an analysis of the output light.

8. The method of claim 7, wherein calculating the rotation based on the analysis of the output light includes:
 determining an intensity difference between a first lobe and a second lobe of the output light; and
 calculating the rotation based on the intensity difference.

9. The method of claim 1, wherein the photonic device comprises a gyroscope.

10. A photonic device comprising:
 a ring resonator; and
 a readout structure coupled to the ring resonator at one or more coupling points, the readout structure comprising:
  a lower waveguide and an upper waveguide;
  an input port coupled to the lower waveguide or the upper waveguide, the input port configured to receive light;
  a beam splitter for splitting the light between the lower waveguide and the upper waveguide in a forward direction and for combining the light in the lower waveguide traveling in a reverse direction and the light in the upper waveguide traveling in the reverse direction to form output light;
one or more spatial phase tilters for spatially phase tilting one or both of the light in the lower waveguide and the light in the upper waveguide; and
a detector for detecting the output light;
wherein the photonic device is configured to:
couple the light in the lower waveguide traveling in the forward direction and the light in the upper waveguide traveling in the forward direction into the ring resonator at the one or more coupling points; and
couple the light in the ring resonator into the lower waveguide and the upper waveguide in a reverse direction at the one or more coupling points.

11. The photonic device of claim 10, wherein the one or more coupling points is a single coupling point, and wherein the lower waveguide and the upper waveguide are connected to each other at the single coupling point.

12. The photonic device of claim 10, wherein the one or more coupling points includes two coupling points, and wherein the lower waveguide and the upper waveguide are unconnected to each other at either of the two coupling points.

13. The photonic device of claim 10, wherein the beam splitter is formed by positioning a region of the lower waveguide within a threshold distance of a region of the upper waveguide.

14. The photonic device of claim 10, further comprising a light source configured to generate the light.

15. The photonic device of claim 10, wherein the ring resonator introduces a relative phase shift between the light in the lower waveguide traveling in the reverse direction and the light in the upper waveguide traveling in the reverse direction.

16. The photonic device of claim 10, wherein a rotation of the photonic device is calculated based on an analysis of the output light.

17. The photonic device of claim 16, wherein the rotation is calculated based on an intensity difference between a first lobe and a second lobe of the output light.

18. The photonic device of claim 10, wherein the photonic device comprises a gyroscope.

19. A photonic device comprising:
a ring resonator; and
a readout structure coupled to the ring resonator at one or more coupling points, the readout structure comprising:
an input port for receiving light;
a lower waveguide and an upper waveguide for carrying the light in both a forward direction and a reverse direction;
a beam splitter formed between the lower waveguide and the upper waveguide for splitting the light;
one or more spatial phase tilters formed on the lower waveguide or the upper waveguide for spatially phase tilting the light; and
a detector for detecting the light traveling in the reverse direction.

20. The photonic device of claim 19, wherein a rotation of the photonic device is calculated based on an analysis of the detected light.

* * * * *